United States Patent Office 2,759,313
Patented Aug. 21, 1956

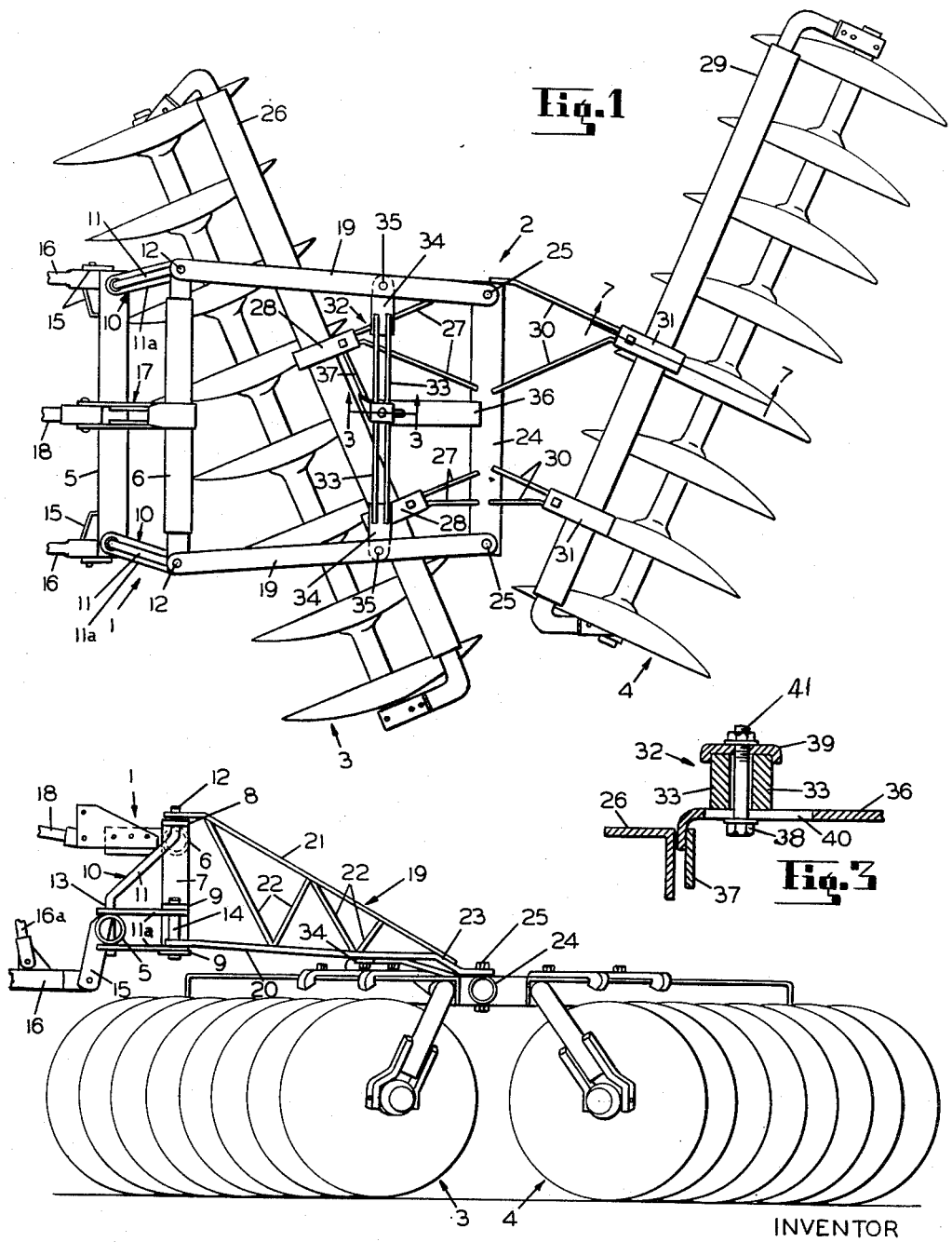
Aug. 21, 1956  D. J. CAMPBELL  2,759,313
LIFT TYPE DISC HARROW
Filed Jan. 19, 1954  4 Sheets-Sheet 1
INVENTOR
BY DONALD J. CAMPBELL
ATTORNEYS

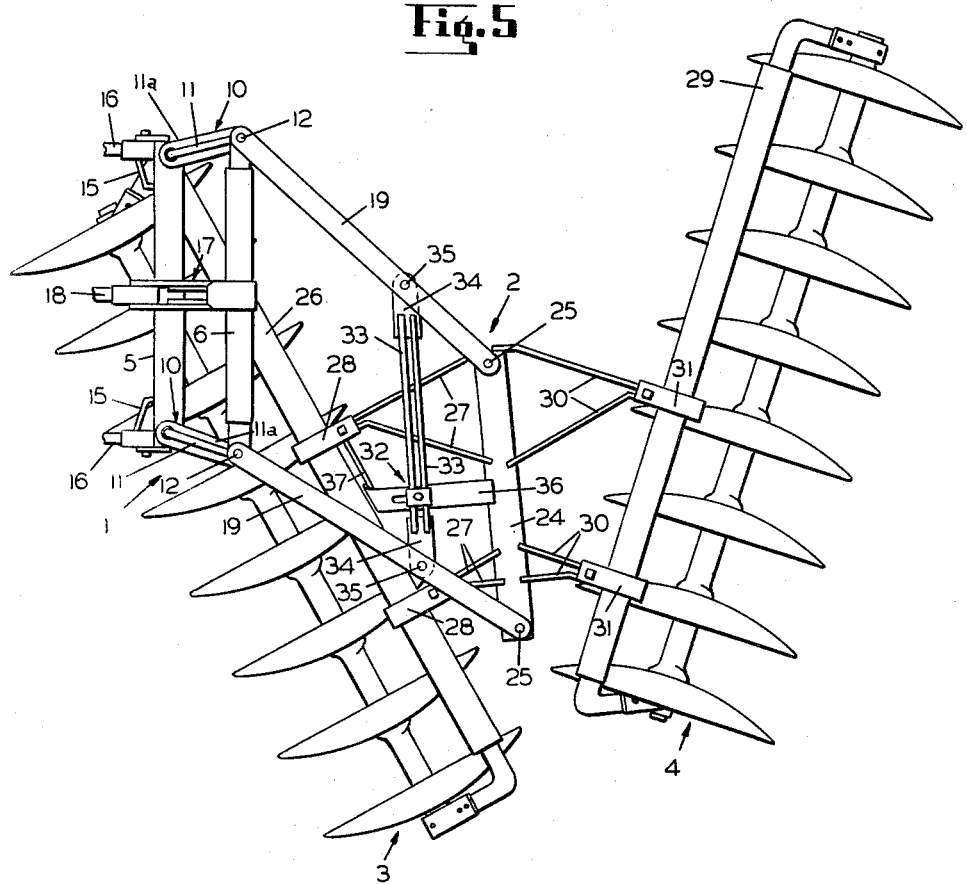

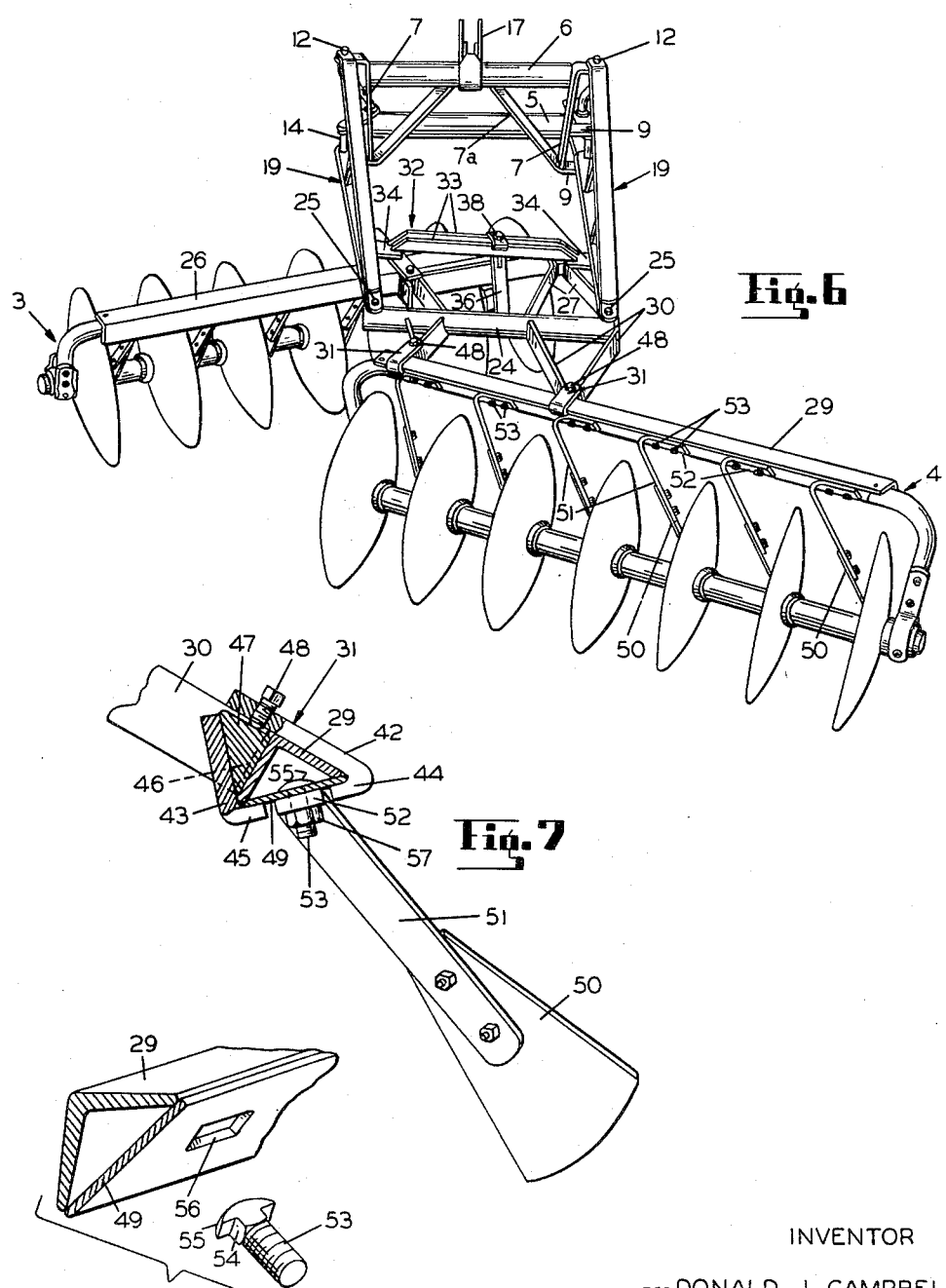

2,759,313

LIFT TYPE DISC HARROW

Donald J. Campbell, Stockton, Calif., assignor to J. I. Case Company, Racine, Wis., a corporation of Wisconsin Application January 19, 1954, Serial No. 404,827

10 Claims. (Cl. 55—83)

This invention relates to a tractor mounted, lift type offset harrow and the main objects of the invention are, to provide such a harrow of generally improved design requiring less manual effort for adjustment; to provide in such a harrow, means whereby the disc gangs may be easily and quickly adjusted to right and left offset positions relative to the tractor and whereby the draft of the tractor is automatically centered; to reduce side draft and attain easier steering; to provide harrow gang frames having improved constructional details to enable the frames to effectively resist torsional and bending forces; to provide a harrow in which the various indicated adjustments may be made by one man without exerting heavy manual effort; and in general it is the object of the invention to provide an improved lift type offset disc harrow structure of the character indicated.

Other objects and advantages of the invention will be understood by reference to the following specification and accompanying drawings (4 sheets) wherein there is described and illustrated a lift type disc harrow structure embodying a selected form of the invention.

In the drawings:

Fig. 1 is a plan.

Fig. 2 is a side elevation.

Fig. 3 is a section on the line 3, 3 of Fig. 1.

Figs. 4 and 5 are plans similar to Fig. 1 but showing changed positions of the harrow gangs for offset work.

Fig. 6 is a rear perspective, illustrating the disc harrow plow gangs each adjusted in the direction of their axes to increase the width of the area covered by the harrow.

Fig. 7 is a cross-section on the line 7, 7 of Fig. 1; and,

Fig. 8 is a perspective illustration of a form of connection employed as shown in Figs. 6 and 7.

Figure 4:
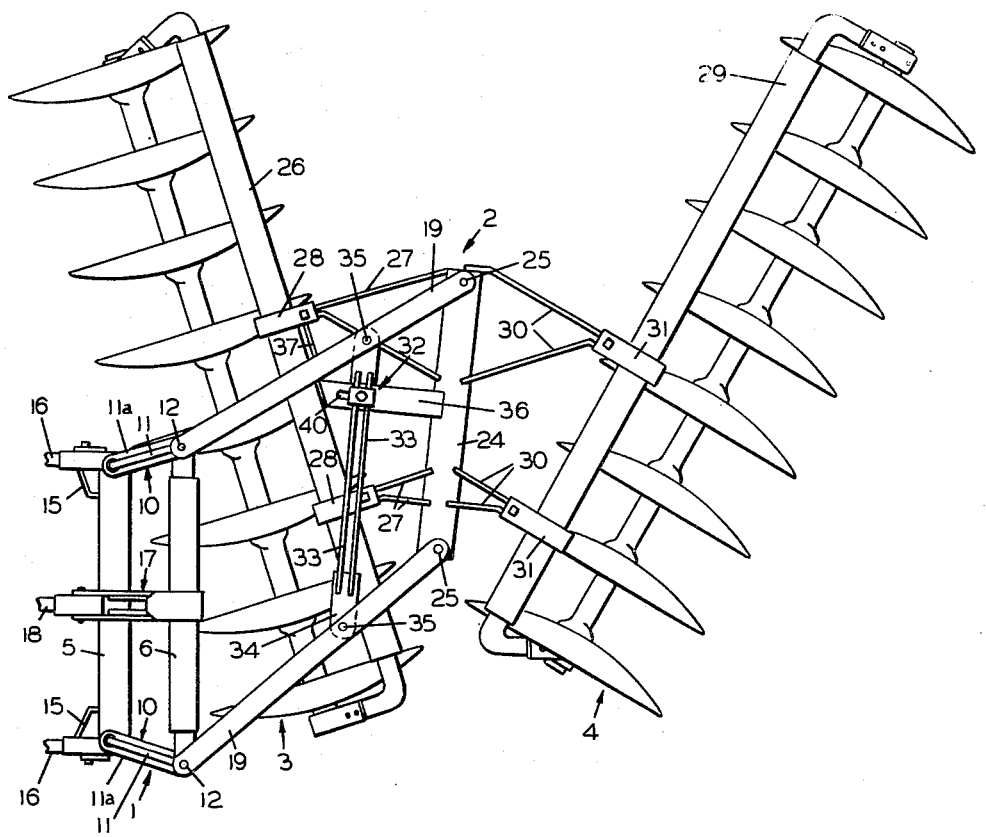

The disc harrow structure illustrated in the drawings comprises a hitch frame structure 1, and a frame structure 2 which supports a pair of disc harrow gangs 3 and 4.

The hitch frame 1 comprises a pair of rigid transverse members 5 and 6, these members being disposed in parallel but horizontal and vertically spaced relation to each other, the rear member 6 being disposed in upwardly spaced relation to the front member 5. The rear member 6 is provided with rigid end brackets 7 which extend downwardly therefrom and said brackets provide upper endwise extending ears 8, and lower endwise extending pairs of ears 9, the latter being vertically aligned with the respective overlying ears 8. The brackets 7 are desirably braced by diagonal braces 7a (see Fig. 6) which extend between the lower ends of said brackets and intermediate portions of the transverse member 6. The lower ears of each pair of ears 9 may be provided by extensions of the lower ends of said braces 7a as shown.

The front transverse member 5 has the rear member 6 laterally shiftably but vertically fixedly connected thereto through the agency of a pair of rearwardly diverging or forwardly converging links 10 respectively connecting the ends of said members 5 and 6. The links 10 at each end comprise angularly disposed upper members 11 and a pair of parallel, normally horizontally disposed lower members 11a. The link rod 11 at each side of the implement has its upper end provided with a vertical pivot or pintle portion 12 which is pivotally fitted into a suitable opening provided in the upper ear 8 of the rear transverse member 6. The lower forward end of each link rod 11 has a vertically disposed downwardly extending pintle portion 13 which fits through suitable bearing openings in the end portions of the front transverse member 5 and through similar openings provided in the adjacent pair of link members 11a. Suitable means (such as a washer and cotter key, not shown) may be provided on the upper and lower end portions of the said pintle portions 12 and 13 to prevent separation of the assembled parts.

The lower link members 11a at each side extend rearwardly in parallel relation to each other in a normally horizontal plane, and said link pairs parallel the angle of convergence of the respectively associated link rods 11. The rear ends of said link members 11a are provided with openings to receive pivot pins such as indicated at 14 which are also seated in the ear pairs 9 in vertical axial alignment with the upper pintle portions 12 of the link rods 11. It will be seen that the diverging link structure at each end, comprising, the rod 11 and the link members 11a, will serve to maintain the front and rear transverse members 5 and 6 in relatively fixed relationship vertically while permitting the same to shift laterally of each other.

The front transverse member 5 is provided at its ends with suitable bracket elements 15 which form a clevis for receiving between them a pair of tractor hitch draft arms 16, the front ends of which are horizontally pivoted to the tractor. The rear transverse member 6 is provided, approximately centrally of its length, with a suitable bracket structure 17 for receiving a third tractor hitch rod or link 18. The hitch arms 16 extend in a general horizontal direction and supply the main draft force to the harrow structure. Lift links 16a extend upwardly and forwardly from points of attachment to the hitch arms 16 intermediate their lengths, to power operated arms carried by the tractor, whereby lifting force may be applied to said hitch arms to lift the harrow from the ground for transportation purposes. The upper hitch link 18 cooperates with the hitch arms 16 by guiding the upper portion of the hitch frame 1 when said hitch arms 16 are actuated to raise or lower the harrow.

The harrow supporting frame 2 comprises opposite side members 19, 19 each of which is fabricated from a lower side bar 20 (Fig. 2), an upper bar 21, and a plurality of angularly disposed truss rods or bars 22 which extend between the lower and upper bars and are welded thereto to provide a rigid truss like structure. The lower and upper bars 20 and 21 converge so that the rear end of the upper bar 21 engages an angularly disposed portion 23 of the lower bar 20 to which it may be welded or otherwise suitably secured. The front ends of the lower and upper bars 20 and 21 are respectively provided with end portions which are parallel to each other and which are suitably apertured to fit on the pivot pin 14 and the pivot pin 12. It will be seen that the said members 19 are capable of swinging laterally about the common pivot axes of the pivot pin 12 and pivot pin 14 but that said side members are vertically fixedly related to the hitch frame 1 by reason of the vertically spaced connections provided by the vertically spaced pivot pins 12 and 14. This vertically fixed relationship causes the entire harrow structure to be raised and lowered with the hitch frame so that the harrow may be raised from and supported clear of the ground for transportation purposes when desired.

A rear cross member 24 is pivotally connected adjacent its ends as indicated at 25 to the rear ends of the respective side frames 19. The disc gang 3 includes a frame bar 26 which is connected to the rear cross member 24 through the agency of pairs of bars 27 which are welded at their rear ends of the cross member 24 and have their front ends provided with holders 28 which slidably receive the said frame bar 26. Similarly, the harrow unit 4 comprises a frame bar 29 which is connected to the rear cross member 24 through the agency of pairs of bars 30 which are welded to said cross member 24 and provided at their rear ends with holders 31 which slidably receive said frame bar 29 of the harrow unit. Provision is made, as will hereinafter be explained, for locking the harrow gang frame bars 26 and 29 in selected position of adjustment in said holders 28 and 31 respectively.

The side frames 19, 19, in addition to being connected at their rear ends to the rear cross member 24 are interconnected intermediate their front and rear ends by means of an intermediate cross member 32. This intermediate cross member 32 comprises a pair of parallel bars 33, 33 (see Figs. 1 and 5) which are disposed in spaced relation to each other and which have their ends welded to end plates 34, 34 which extend under the respective side frames and are pivotally connected thereto by suitable pivots 35. A longitudinally extending locking bar 36 has its front end welded to a bar 37 which extends between and is secured to the holders 28 of the forward harrow unit supporting structure, and its rear end welded to said rear cross member 24. Said locking bar 36 is disposed immediately below the spaced bars 33 of the intermediate cross member and it is adapted to be clamped or locked thereto in selected position of adjustment along the length of said intermediate cross member. To that end, a bolt 38 extends through a suitable cap 39 (see Fig. 3) which overlies the cross member 32, between said bars 33 of the intermediate cross member, and through a slot 40 in the locking bar 36. A nut 41 bearing on a suitable washer which straddles the slot 40 may be tightened to lock the parts in selected position of adjustment.

From the foregoing explanation, it will be seen that the harrow structure is capable of limited sidewise or lateral shifting incident to the described connection of the rear transverse member 6 to the front member 5 by reason of the rearwardly diverging links at the opposite ends of the transverse members. The hitch rods 16 tend to maintain the front transverse member 5 centered on the tractor. The links, comprising the rods 11 and members 11a at each end of the hitch frame, if projected forwardly, will intersect to provide a constructive pivot axis or draft point near the center line or in the vertical plane of the center line of the rear axle of the tractor. This detail results in easier steering and permits fairly free although limited maneuvering of the tractor with respect to the harrow gangs while the forces along the said links remain balanced. When the tractor and harrow are moving forwardly, the angle of these links can be equalized by adjusting the ground penetration of the front gang relative to the rear disc gangs.

When the locking bar 36 is locked to the intermediate cross member 32 by means of the locking bolt 38, the harrow supporting frame comprising the side members 19, 19 and the intermediate and rear cross members 32 and 24 respectively will be locked against lateral shifting movement about the axis of the pivots 12 and 14 at each side. However, by loosening said clamping bolt 38, said harrow supporting frame structure will be released for lateral rocking movement about said pivots 12 and 14 at each side, to permit the harrow to be positioned or to assume positions to the desired side of the center line of draft of the tractor for offset harrowing. The desired offset relation of the harrow gangs relative to the tractor may be obtained by first loosening the clamping bolt and nut 38, 41 and then advancing the tractor and harrow while steering the tractor to the right or to the left to cause the harrow structure to become offset to the desired extent. The clamping bolt and nut are then again tightened to lock the harrow gangs in the selected offset position. However, this adjustment may also be easily made by first lifting the harrow so that the discs clear the ground, loosening the clamping bolt and nut 38, 41, and then manually moving the harrow gangs to the right or left as desired, and then retightening said clamping bolt and nut. This manual adjustment may be quickly accomplished within relatively limited areas such as are encountered in orchards and vineyards.

In the offset operation of the tractor and harrow, reaction forces on the harrow have a strong tendency to force the harrow back to a centered relationship to the tractor. In the described construction these reaction or side draft forces are, to a substantial degree, automatically compensated or corrected by changes in the angular positions of the harrow gangs. For example, when the harrow structure is offset to the right of the line of draft, the harrow supporting frame structure will be shifted to position such as that represented in Fig. 4. By reference to that figure, it will be seen that the rear cross member 24 has assumed an angular relationship to the rear transverse member 6 of the hitch frame, said cross member 24 now being inclined rearwardly and to the right of said hitch member 6. Since the angular positions of the disc gangs relative to each other and relative to the said rear cross member 24 are fixed, the angularity of the front disc gang 3 to the line of draft is somewhat reduced and the angularity of the rear disc gang 4 is somewhat increased in said offset position. The tendency for the discs is, of course, to travel more or less in the direction of the planes of the discs so that in this instance the front gang of discs will tend to travel more nearly straight forwardly, thereby counteracting to a considerable extent the reaction forces which tend to shift the harrow structure back to centered position. The angularity of the discs of the rear gang 4 relative to the line of draft is somewhat increased in a direction which tends to cause the harrow structure to have an increased tendency to shift to the right whereby said reaction forces are further counteracted.

When the harrow structure is offset to the left as represented in Fig. 5, it will be seen that the rear cross member 24 assumes an angular position relative to the line of draft which causes the front disc gang 3 to assume a somewhat increased angular relationship and the rear disc gang 4 a position of less angularity to the line of draft so that the disc gangs 3 and 4 respectively have an increased tendency to travel to the left and a reduced tendency to travel to the right; hence there is automatically produced correction or compensation for increased side draft incident to offset harrowing. This automatic correction for side draft eliminates the need for manual adjustment which has heretofore been required.

In the described structure the harrow gangs may also be adjusted in the direction of their axes to increase or decrease the width of the path covered by the harrow, the amount of overlap of the gangs being accordingly varied. As shown in Fig. 1, the gangs 3 and 4 are in nearly fully overlapping relationship. They may, however, be adjusted so that only two or three discs of the rear gang overlap two or three discs of the front gang. Such an adjusted condition is illustrated in Fig. 6 wherein the front gang 3 is shown extended to the left, nearly to the limit of its permissible adjustment and the rear gang 4 is shown extended to the right, nearly to the limit of its permissible adjustment in that direction.

For mounting the harrow gangs for the last mentioned longitudinal adjustment, the frame member 29 of the harrow gang 4, is longitudinally slidably mounted in the holding members 31. As shown in Fig. 7, the frame member 29 is of angle iron construction and it is slidably received between upper and lower holder elements 42 and 43 of which each of the holders 31 are formed. These members 42 and 43 are welded to the respective pairs of bars 30 in the relationship shown in Fig. 2 so that hook forming end portions 44 and 45 of the respective members approach each other so as to co-operate with the main legs of the members 42 and 43 and with the adjacent ends 46 of the bars 30 to form a triangular passageway or opening in which the member 29 is slidable. The opening or passageway thus formed is, of course, of such size that the frame member 29 is a free and easy sliding fit therein. In each of these passageways there is provided a wedge block 47 which, by means of a set screw 48 threaded through the main arm of the upper holder member 42, may be forced downwardly across the inside face of the member 43 between the bars 30 into wedging engagement with the adjacent leg of the angle iron frame member 29. By forcing the locking wedge 47 downwardly to a sufficient extent, the frame member 29 may be securely wedged against the holder elements 44 and 45 and thereby locked in selected position of adjustment in the respective holders 31. The frame member 26 of the front harrow gang is similarly longitudinally adjustably mounted in the front holders 28.

The front harrow gang 3 may be adjusted to the left and the rear harrow gang 4 may be adjusted to the right from positions such as represented in Fig. 1, by loosening the respective holding clamps 28 and 31 and moving the structure forwardly with the discs in engagement with the ground until the desired adjustment is obtained. Similarly, adjustment of the harrow gang 3 to the right and of the gang 4 to the left from positions such as represented in Fig. 6, may be effected by loosening said holding clamps and moving the structure rearwardly. Adjustment results from the tendency of the discs to move in the directions of their planes when in the ground. Each gang may be adjusted independently of the other in the desired direction and both gangs may be simultaneously adjusted in opposite directions.

In Fig. 7 the angle iron frame member 29 is illustrated as having its interior angle closed by a cover plate 49 which is welded along its edges to the free edges of the legs of the angle iron member which is, in effect, thereby made into a tubular frame bar. This plate 49 provides a somewhat increased area of contact between the frame structure 29 and legs 44 and 45 of the clamp structure to provide adequate area for secure clamping engagement. This plate 49 is not essential for the purpose of adjustably mounting the disc gang in the manner described, but it provides a convenient wall on which the scrapers 50 may be mounted (as shown in Figs. 6 and 7) and, of greater importance, results in a harrow gang frame bar of very rigid triangular construction which is well able to resist the torsional and bending forces to which this member is subjected. The front gang frame member 26 is similarly constructed.

The scrapers 50 are not always required on the harrow and are preferably detachably mounted so that they may be readily removed or applied as desired. These scrapers 50 are carried by suitable arms 51 which extend angularly from base or mounting arm portions 52 which are integral with said arms 51. The mounting arm portions 51 are adapted to be placed flatwise against the frame plate portion 49 of the tubular frame bar and secured thereto by pairs of bolts indicated at 53. These bolts 53 are in the nature of carriage bolts having square shank portions 54 (see Fig. 8) and head portions 55 which, instead of being of circular form as in an ordinary carriage bolt, are of narrow elongated cross head form; the width of the head of the bolt corresponds to the width of the square shank portion 54 and the length is considerably greater as shown. The result is a form of T-head bolt. Such T-head bolts may be moved endwise, head first, through elongated or rectangular openings or slots such as represented at 56 in the frame plate 49 until the bolt can be rotated on its own axis so as to position the head 55 of the bolt crosswise of the opening 56 in which position it will be held by the interfitting relationship of the square shoulder portion 54 in the slot 56. A suitable degree of adjustability of the bolt 53 lengthwise of the frame 29 is also provided incident to the elongation of the slot 56 relative to the transverse dimension of the square shoulder 54 of the bolt. For each scraper, a pair of bolts of the character described are positioned in the frame element 49 whereupon the scraper supporting brackets 51 may be positioned on the bolts and nuts 57 applied to the bolts to fasten the scrapers to the frame structure. The aforementioned adjustability of the bolts 53 in the slots 56 permits adjustment of the position of the operative end edges of the scrapers relative to the faces of the disc. The width of the scraper mounting arms 52 is such that these arms may pass between the mutually facing ends of the clamp legs 44 and 45 so that longitudinal adjustability of the harrow gangs will not be affected by the presence of the scrapers.

The self-centering hitch frame is desirable for its effect in easing the steering of the tractor when the harrow is attached but the self-centering arrangement may be dispensed with and replaced by directly connecting the harrow supporting frames to the tractor or to a simple hitch frame or cross bar (such as represented by the rear hitch frame member 6) which would be suitably connected to the tractor. Also, the automatic adjustment for side draft may be employed with a single harrow gang if desired.

Various changes in the described details of construction may be made while retaining the principles of the described construction.

I claim:

1. A lift type disc harrow for tractor operation having a harrow supporting frame comprising a pair of side members pivotally supported at their front ends and cross member extending between and pivotally connected to portions of said side members rearwardly of the front ends thereof, a harrow gang rigidly secured to said cross member, said harrow gang and cross member being shiftable as a unit about the front end pivots of said side members to selected offset positions relative to a predetermined normal center position of said supporting frame, and means for releasably locking said frame in the desired adjusted position.

2. A lift type offset disc harrow for tractor operation having a harrow supporting frame comprising a pair of rearwardly converging side members axially vertically pivotally supported at their front ends, a cross member extending between and axially vertically pivotally connected to said side members rearwardly of the front ends thereof, a harrow gang secured to said cross member so as to be shiftable with said supporting frame about the front end pivots of said side members to selected positions offset to either side of a predetermined normal center position of said frame, the rearward convergence of said side members serving, when said supporting frame is adjusted to an offset position, to cause said harrow gang to adjust its angular position relative to the line of draft of the harrow in a manner to counteract the tendency of side draft to shift the harrow gang back to said normal position, and means for releasably locking said frame and harrow gang in the desired adjusted position.

3. A lift type offset disc harrow having a harrow supporting frame comprising a pair of rearwardly converging side members pivotally supported at their front ends for horizontal rocking movement, and a cross member extending between and pivotally connected to said side members rearwardly of the front ends thereof, front and rear harrow gangs secured to said cross member respectively in fixed opposite angular relationships thereto, said harrow gangs being selectively horizontally shiftable with said supporting frame about the front end pivots of said side members to selected offset positions relative to a predetermined normal central position of said harrow gangs and frame, the rearward convergence of said side members serving to cause said cross member and the harrow gangs attached thereto to adjust their angular positions relative to the line of draft of the harrow in a manner to counteract the tendency of side draft to shift the harrow gangs and said frame back to said normal position, and means for releasably locking said frame and harrow gangs in the desired adjusted position.

4. A lift type disc harrow for tractor operation having a harrow supporting frame comprising a pair of side members pivotally supported at their front ends for horizontal rocking movement, and a pair of spaced, parallel cross members extending between and pivotally connected to said side members rearwardly of the front ends thereof, a harrow gang secured to one of said cross members so as to be selectively horizontally shiftable with said supporting frame about the front end pivots of said side members to selected offset positions relative to a predetermined normal center position of said frame, and a locking bar extending between and rigidly secured to one and adjustably connected to the other of said pair of cross members, whereby said harrow supporting frame is releasably lockable in selected position of adjustment.

5. A lift type offset disc harrow for tractor operation having a harrow supporting frame comprising a pair of rearwardly converging side members pivotally supported at their front ends for horizontal rocking movement, and a pair of spaced, parallel cross members extending between and pivotally connected to said side members rearwardly of the front ends thereof, a harrow gang secured to one of said cross members so as to be horizontally shiftable with said supporting frame about the front end pivots of said side members to selected positions offset to either side of a predetermined normal center position of said frame, the rearward convergence of said side members serving, when said supporting frame and harrow gang are adjusted to an offset position, to cause said harrow gang to adjust its angular position relative to the line of draft of the harrow in a manner to counteract the tendency of side draft to shift the harrow gang back to said normal position, and a locking bar extending between and rigidly secured to one and adjustably connected to the other of said pair of cross members, whereby said harrow supporting frame is releasably lockable in selected position of adjustment.

6. A lift type offset disc harrow having a harrow supporting frame comprising a pair of rearwardly converging side members pivotally supported at their front ends for horizontal rocking movement, and a pair of spaced, parallel cross members extending between and pivotally connected to said side members rearwardly of the front ends thereof, front and rear harrow gangs secured to one of said cross members respectively in fixed opposite angular relationships thereto, said harrow gangs being horizontally shiftable with said supporting frame about the front end pivots of said side members to selected offset positions relative to a predetermined normal center position of said harrow gangs and frame, the rearward convergence of said side members serving to cause said harrow gangs to adjust their angular positions relative to the line of draft of the harrow in a manner to counteract the tendency of side draft to shift the harrow gangs and said frame back to said normal position, and a locking bar extending between and rigidly secured to one and adjustably connected to the other of said cross members, whereby said harrow supporting frame is lockable in selected position of adjustment.

7. A lift type harrow for tractor operation, comprising a hitch frame having horizontally spaced front and rear transverse members, a pair of forwardly converging links pivoted at their ends to said front and rear transverse members, whereby said front and rear members are interconnected so as to be laterally shiftable relative to each other, said converging links being arranged so as to provide a constructive draft point in advance of said hitch frame and which point is adapted to be located in proximity to the center line or the vertical plane of the center line of the rear axle of a tractor to which the harrow is connected, means carried by said front transverse member adjacent the ends thereof and by said rear transverse member intermediate the ends thereof for connection to tractor hitch bars, and a harrow connected to said rear transverse member of said hitch frame, said forwardly converging links serving to cause said harrow to be self-centering relative to the line of draft of the tractor.

8. A lift type disc harrow for tractor operation, comprising a hitch frame having horizontally and vertically spaced front and rear transverse members, said rear transverse member being disposed at an elevation above said front member and having rigid end portions provided with vertically spaced pivot ears, a pair of forwardly converging links respectively having front ends pivoted to said front member adjacent the ends thereof and vertically spaced rear end portions pivotally secured to said vertically spaced pivot ears of said rear transverse member, whereby said front and rear members are interconnected so as to be held in vertically fixed, but laterally shiftable relationship to each other, said converging links being arranged so as to provide a constructive draft point in advance of said hitch frame and which point is adapted to be located in proximity to the center line or the vertical plane of the center line of the rear axle of a tractor to which the harrow is connected, means carried by said front transverse member adjacent the ends thereof and by said rear transverse member intermediate the ends thereof for connection to tractor hitch and lifting bars, and a harrow connected to said vertically spaced ears of said hitch frame so as to be secured in vertically fixed relation to said hitch frame for unitary vertical adjustment therewith.

9. A lift type offset disc harrow for tractor operation, comprising a hitch frame having horizontally spaced front and rear transverse members, a pair of forwardly converging links pivoted at their ends to said front and rear transverse members, whereby said front and rear members are interconnected so as to be laterally shiftable relative to each other, said converging links being arranged so as to provide a constructive draft point in advance of said hitch frame and which point is adapted to be located in proximity to the center line or the vertical plane of the center line of the rear axle of a tractor to which the harrow is connected, means carried by said hitch frame for connection to tractor hitch bars, a harrow supporting frame having a pair of side members pivotally connected to said rear transverse hitch frame member and extending rearwardly therefrom, a harrow disc gang supporting cross member extending between and pivotally connected to said side members, said harrow supporting frame being laterally adjustable about the pivot mountings of said side frames to positions offset to either side of said hitch frame, and means for locking said supporting frame in the desired adjusted position.

10. A lift type offset disc harrow for tractor operation, comprising a hitch frame having horizontally and vertically spaced front and rear transverse members, said rear transverse member being disposed at an elevation above said front member and having rigid end portions provided with vertically spaced pivot ears, a pair of forwardly converging links respectively having front ends pivoted to said front member adjacent the ends thereof and vertically spaced rear end portions pivotally secured to said vertically spaced pivot ears of said rear transverse member, said front and rear members being thereby interconnected so as to be held in vertically fixed but laterally shiftable relationship to each other, said converging links being arranged so as to provide a constructive draft point in advance of said hitch frame and which point is adapted to be located in proximity to the center line of the rear axle of a tractor to which the harrow is connected, means carried by said hitch frame for connection to tractor hitch bars, a harrow supporting frame extending rearwardly from said hitch frame and having a pair of rearwardly converging side members each provided with vertically spaced front end elements pivotally connected respectively to said vertically spaced pivot ears of said rear transverse member, whereby said side members are held in vertically fixed relationship to said hitch frame, a pair of spaced, parallel cross members extending between and pivotally connected to said side members rearwardly of the front ends thereof, front and rear harrow disc gangs, each of said gangs being secured to one of said cross members in angular relationship thereto, the angular disposition of one of said disc gangs being opposite to that of the other gang, said harrow gangs being shiftable with said supporting frame about the pivot mountings of the front ends of said side frames to positions offset to either side of said hitch frame, the rearward convergence of said side frames serving, when said harrow supporting frame and harrow gangs are adjusted to an offset position, to cause said harrow gangs to adjust their angular positions relative to the line of draft of the harrow in a manner to counteract the tendency of side draft to shift said supporting frame and harrow gangs back to a normal centered relationship to said hitch frame, and a locking bar extending between said pair of cross members and rigidly secured to one and adjustably connected to the other thereof, whereby said harrow supporting frame is lockable in selected position of lateral adjustment.

References Cited in the file of this patent

UNITED STATES PATENTS

| | | |
|---|---|---|
| 1,460,930 | Walters | July 3, 1923 |
| 2,074,565 | Schaeffer | Mar. 23, 1937 |
| 2,374,016 | Henneuse | Apr. 17, 1945 |
| 2,379,225 | Fraga | June 26, 1945 |
| 2,575,622 | Fraga | Nov. 20, 1951 |
| 2,599,617 | Davis | June 10, 1952 |
| 2,607,276 | Morton | Aug. 19, 1952 |
| 2,640,708 | Fraga | June 2, 1953 |